INVENTOR.
PAUL F. DE VRIES
JAMES M. SCARBOROUGH
BY
ATTORNEY

United States Patent Office 3,600,155
Patented Aug. 17, 1971

3,600,155
SODIUM PURIFICATION PROCESS
Paul F. De Vries, Ruffsdale, Pa., and James M. Scarborough, Canoga Park, Calif., assignors to the United States of America as represented by the United States Atomic Energy Commission
Filed Sept. 16, 1969, Ser. No. 858,338
Int. Cl. C22b 27/00
U.S. Cl. 75—66
5 Claims

ABSTRACT OF THE DISCLOSURE

A process for the purification of sodium wherein sodium is heated or cooled to a temperature just above its melting point such that impurities, such as sodium oxide, which are very nearly insoluble in sodium at this temperature, rise to the surface of the pool of sodium, whereafter the sodium below the surface, which is essentially free of impurities, is removed. This process is applicable for producing purified sodium for general use, but is particularly effective in a continuous operation as reqiured in circulating systems such as nuclear reactors, heat exchangers, research loops, etc. where continuous removal of impurities is required.

BACKGROUND OF THE INVENTION

The invention described herein was made in the course of, or under, Contract No. AT(11–1)–GEN–8, with the United States Atomic Energy Commission.

This invention relates to a process for the purification of sodium, and more particularly to a sodium purification process which can be readily utilized for the removal of impurities from continuous operational system.

The use of liquid metals as heat transfer media in nuclear reactor systems presents problems in corrosion and mass transfer peculiar to these systems. It is well known that corrosion rates in many liquid metals are greatly accelerated by the presence of oxygen. This is particularly true of the corrosion of steel reactor systems utilizing sodium or NaK as a coolant. The exact nature of the part oxygen plays in the corrosion process is not known; however, considerable success has been experienced in developing means of monitoring and controlling oxygen levels in sodium and NaK.

Various prior art processes have been used for the purification of sodium. Common methods consist of filtration, distillation, cold trapping and hot gettering. Such purification efforts are usually concerned with the removal of oxygen (oxides), carbon, hydrogen, and metallic impurities.

SUMMARY OF THE INVENTION

The process of the present invention is useful in removing all of the above mentioned impurities from sodium, but is particularly directed to the removal of oxygen. The principle of this process is based on the finding that sodium oxide, as well as many other metallic oxides, are very nearly insoluble in sodium at temperatures just above its melting point. Thus, this process involves the heating or cooling of sodium to just above the melting point of sodium wherein the oxides rise to the surface of the molten sodium, whereby the purified sodium below the surface is removed for recirculation in an associated liquid metal cooling system, for example, or for other desired uses.

Therefore, it is an object of the invention to provide an improved process for the purification of sodium.

A further object of the invention is to provide a sodium purification process which involves bringing the sodium to a temperature just above the melting point thereof, and separating the thus purified sodium from impurities.

Another object of the invention is to provide a sodium purification process which can be utilized for the continuous removal of impurities from the sodium of a circulating system.

Another object of the invention is to provide a purification process for a liquid sodium cooled system, wherein continuous removal of impurities from the sodium is required.

Other objects of the invention will become readily apparent from the following description and accompanying drawings.

DESCRIPTION OF THE INVENTION

The principle of the inventive process is based on the fact that sodium oxide, as well as many other metallic oxides, are very nearly insoluble in sodium at temperatures just above its melting point. It has been demonstrated that these oxides rise to the surface of a pool of molten sodium at temperatures where their solubility limits are exceeded. It has furthermore been demonstrated that sodium oxide, and probably other oxides, acts as a scavenger or collector for other interstitial and metallic impurities which may be present. Thus, when a quantity of sodium containing impurities normally associated with sodium is brought to a temperature just above its melting point 97.5° C., for example 98° C. to 103° C., while slightly collect in the surface layer. The sodium below the surface is essentially free of these impurities.

Equipment has been designed, fabricated, and tested which permits the preparation of high purity sodium by application of the inventive process. It has been shown that sodium may be purified by this novel process in batches or continuously by the utilization of equipment similar to that described hereinafter.

Figure 1:
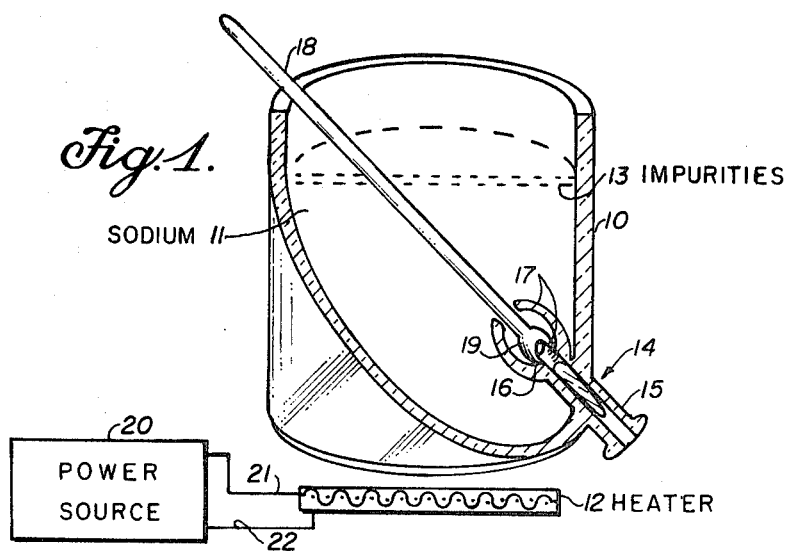
FIG. 1 is a view, partially in cross section, of an embodiment of an apparatus utilized in carrying a batch type operation of the inventive process.

FIG. 1 illustrates an apparatus typical of that which can be used in this process for batch type purification of sodium. The apparatus consists of a container or vessel 10, constructed of Pyrex or other suitable noncontaminating material, containing sodium 11 to be heated in an inert atmosphere by a heater unit 12 to a temperature just above the melting point of sodium, i.e., just above 97.5° C. for example 98° C. to 103° C., while slightly higher temperatures have been shown to be practical. Heating of the sodium 11 to the specified temperature causes the impurities therein to rise to the surface of the sodium, forming a film or layer 13 of impurities, the thickness of layer 13 being shown exaggerated for purpose of illustration. A valve assembly generally indicated at 14 is mounted in container 10 for removing the sodium 11 located below the impurity layer 13. Valve assembly 14 is composed of a hollow outlet tube 15 with one end thereof extending through container 10 is sealed relation with container 10, and the opposite end thereof forming a socket or seat 16 about which are mounted a plurality of guides 17, only two and a portion of a third guide 17 being shown to complete the valve assembly 14, a solid rod 18 terminating in a ball 19 is mounted within guides 17 such that ball 19 cooperates with seat or socket 16 to provide a sodium tight seal therebetween. The valve assembly 14 may, for example, be constructed of Pyrex or other material compatible with sodium and the temperatures involved. Heater unit 12 is controlled by a power source 20 via electrical leads 21 and 22. Thus, upon the sodium 11 being heated to the desired temperature, the rod 18 of valve assembly 14 is raised such that the purified sodium beneath impurity layer 13 is drained from container 10 via outlet tube 15.

While a ball and socket joint type valve assembly has been illustrated, commercial leak-free valves, placed outside the container, which are compatible with sodium, could be utilized. Also, while FIG. 1 illustrates the process as heating the sodium to just above its melting point, the heater unit could be replaced by a controlled cooler unit to cool previously heated sodium to the desired temperature whereby the impurity layer is formed on the surface of the sodium, and the purified sodium extracted from the container via the valve assembly. In addition, the electrical heating mechanism illustrated can be replaced by gas or other types of controlled heater units.

To illustrate the effectiveness of the inventive process when carried out by the FIG. 1 type apparatus, a 400 ml. Pyrex container and Pyrex ball and socket joint valve assembly were utilized. Three hundred grams of sodium (equivalent to reactor coolant grade) was placed in the container and melted inside a inert atmosphere box. Just enough heat was applied to keep the sodium molten. Nine samples ranging in size from 1–11 grams were removed via the valve assembly and analyzed for oxygen content. Oxygen content varied from 0.2 to 1.5 p.p.m. (the process is good to $\sim 0 \pm 1$ p.p.m.); the average is shown below in Table I. When 25 grams of sodium oxide were deliberately added to the sodium in the purification apparatus the oxygen content of the sodium remained at 0.7 p.p.m., in agreement with prior results. Other samples were taken for carbon analysis and for spectrograph analysis. All the results of these tests are shown in Table I. Impurity specifications for reactor grade sodium are also shown in Table I for comparison.

TABLE I.—ANALYSIS OF PURIFIED SODIUM

| | Concentration in p.p.m. | |
| --- | --- | --- |
| Element | Purified sodium | Specification ST0170NB reactor grade sodium, max. |
| Al | (¹) | 10 |
| B | ¹ <25 | 1 |
| Ba | (¹) | 10 |
| C | <10 | 30 |
| Ca | <10 | 20 |
| Cd | (¹) | 2 |
| Co | (¹) | 0.5 |
| Fe | <1 | 25 |
| Halogens | | 20 |
| K | | 200 |
| Li | | 10 |
| Mn | (¹) | 5 |
| Ni | (¹) | 10 |
| O | 0.7 | 100 |
| Pb | (¹) | 10 |
| Rb | | 50 |
| Si | ¹ <10 | 20 |
| Sn | (¹) | 10 |
| R.E. | | 0.8 |

¹ Not detected.

The inventive process as thus far described and supported by tests has been for the preparation of batch quantities of high purity sodium. However, as described hereinafter and partially illustrated by block diagram in FIG. 2, the inventive process is readily adapted to continuous operation for circulating sodium systems such as nuclear reactors, heat exchangers, research loops, etc., where continuous removal of impuirities is required.

The equilibrium solubilities of many impurities in sodium as a function of temperature is well known. Most sodim-cooled systems are operated with a sodium oxide content equivalent to a saturated condition between 120° C. to 235° C. (5 p.p.m. to 50 p.p.m.). It has been found, in accordance with the invention, that when sodium is cooled from an operating temperature range of about 400° F. (205° C.)–700° F. (372° C.) to a temperature just above the melting point of sodium (97.5° C. or 207.3° F.), sodium oxide and other impurities which have a limited solubility precipitate out by rising to the surface of the sodium, and thus the purified sodium below the surface can be removed and recirculated back into the cooling system.

Figure 2:
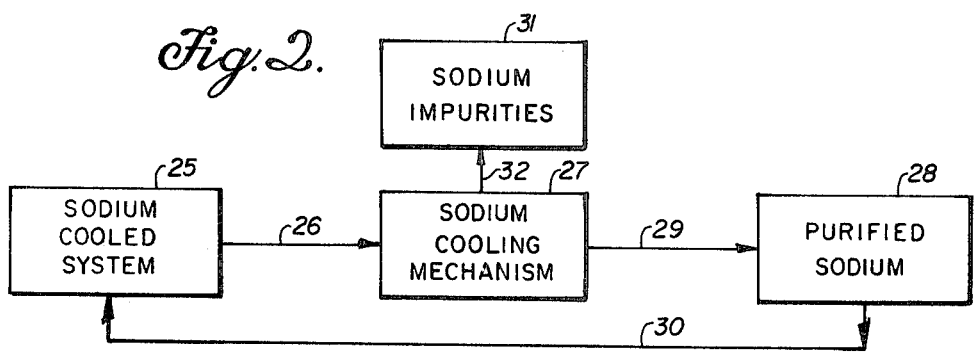
FIG. 2 is a block-type flow diagram illustrating the inventive process as utilized in a continuous flow type operation.

The following manner of carrying out a continuous sodium purification operation in accordance with the inventive process and with reference to the FIG. 2 block diagram will illustrate the effectiveness of the novel process for the continuous removal of impurities in sodium-cooled or sodium circulation systems.

Liquid sodium of a temperature of 400° F. to 700° F., for example, from a sodium-cooled system 25, such as a nuclear reactor, is directed as indicated by arrow 26 into a sodium cooling mechanism 27 wherein the sodium is cooled to a temperature just above the melting temperature of sodium (207.3° F. or 97.5° C.), whereupon impurities such as sodium oxide, which are insoluble in sodium at that temperature rise to the surface of the molten sodium. With the impurities forming an upper layer of film, the purified sodium indicated at 28 can be drained or withdrawn from the cooling mechanism 27 via a valve assembly or other means indicated by arrow at 29 and returned as indicated by arrow 30 to the sodium-cooled system 25. The impurities indicated at 31 are periodically withdrawn from the cooling mechanism by appropriate means indicated by arrow 32. While the details of the apparatus for carrying out the continuous impurity removal process do not constitute part of this invention, such apparatus is available in the art. For example, the cooling mechanism 27 could constitute a series heat exchangers arrangement to bring the temperature of the operating sodium down to the desired temperature wherein such temperature is maintained in a series of selectively connected vessels or containers, such that the purified sodium withdrawing operation can be in process from one container while another container is being filled, etc. Also, the purified sodium 28 may serve as a heat exchange media to cool the sodium coming from the system 25 while utilizing the heat therefrom to bring the temperature of the purified sodium 28 up toward the operating temperature of the system 25.

It has thus been shown that the present invention provides a process for the purification of sodium which is useful, convenient, and economical for use in the preparation of batch quantities of high purity sodium or for continuous removal of impurities from sodium used as the circulation media of various systems.

While particular embodiments of the inventive process and apparatus for carrying out the process have been illustrated and described, modifications will become apparent to those skilled in the art, and it is intended to cover in the appended claims all such modifications as come within the spirit and scope of the invention.

What is claimed is:

1. A process for the purification of sodium in continuous circulating sodium systems such as nuclear reactors comprising the steps of: continuously directing a quantity of sodium from a continuous sodium circulating system, containing the thus directed quantity of sodium, bringing the thus contained sodium to a temperature in the range of about 90° C., to about 103° C., maintaining the thus contained sodium in this temperature range whereby at least a portion of the impurities in the sodium rise to the surface of the contained sodium withdrawing from the thus contained sodium that purified sodium located intermediate the impurity containing sodium surface and the lower portion of the contained sodium, and returning to the sodium circulating system the withdrawn purified sodium in liquid state.

2. The process defined in claim 1, wherein the step of bringing the thus contained sodium to the temperature range is accomplished by heating the sodium.

3. The process defined in claim 1, wherein the step of bringing the thus contained sodium to the temperature range is accomplished by cooling the sodium.

4. The process defined in claim 1, the step of returning the withdrawn purified sodium to the circulating system includes the step of adsorbing heat from the liquid sodium supplied therefrom into the purified sodium whereby the supplied sodium is cooled thereby and the purified sodium is heated thereby.

5. The process defined in claim 1, additionally including the step of removing from the thus contained sodium the impurity containing sodium surface.

References Cited

UNITED STATES PATENTS

| | | | |
|---|---|---|---|
| 2,434,105 | 1/1948 | Fleming et al. | 75—93X |
| 2,745,552 | 5/1956 | Bruggleman et al. | 75—66X |
| 2,815,277 | 12/1957 | Bruggleman et al. | 75—66 |
| 2,866,702 | 12/1958 | Batutis et al. | 75—66X |
| 2,879,157 | 3/1959 | Batutis et al. | 75—66 |

L. DEWAYNE, RUTLEDGE, Primary Examiner

J. M. DAVIS, Assistant Examiner

U.S. Cl. X.R.

75—93

UNITED STATES PATENT OFFICE
CERTIFICATE OF CORRECTION

Patent No. 3,600,155           Dated August 17, 1971

Inventor(s) Paul F. DeVries and James M. Scarborough

It is certified that error appears in the above-identified patent and that said Letters Patent are hereby corrected as shown below:

Claim 1, line 7, for "90" read --98--.

Signed and sealed this 18th day of June 1974.

(SEAL)
Attest:

EDWARD M. FLETCHER, JR.           C. MARSHALL DANN
Attesting Officer           Commissioner of Patents